United States Patent [19]

Cech

[11] Patent Number: 4,546,950
[45] Date of Patent: Oct. 15, 1985

[54] SHOCK ABSORBING SUPPORT FOR MICROPHONES

[75] Inventor: Karl Cech, Mödling, Austria

[73] Assignee: AKG Akustische a.Kino Geräte Gesellschaft, Austria

[21] Appl. No.: 384,004

[22] Filed: Jun. 1, 1982

[30] Foreign Application Priority Data

Jun. 4, 1981 [AT] Austria .............................. 2503/81

[51] Int. Cl.[4] ............................................. H04R 1/02
[52] U.S. Cl. .................................... 248/610; 248/60; 248/317; 211/60.1; 179/146 R
[58] Field of Search .............. 248/610, 618, 619, 621, 248/628, 604, 60, 49, 104, 317; 211/60 R; 179/146 R, 147, 154; 206/443; 267/160; 174/99 R; 138/108, 112, 113

[56] References Cited

U.S. PATENT DOCUMENTS

| 1,086,442 | 2/1914 | Cornelius | 248/60 |
| 2,920,150 | 1/1960 | Burroughs | 248/317 |
| 3,204,901 | 9/1965 | Dunn | 248/610 |
| 3,224,054 | 12/1965 | Lige | 24/16 PB |
| 4,194,096 | 3/1980 | Ramsey | 179/147 |
| 4,293,114 | 10/1981 | Lykes | 248/672 |
| 4,385,696 | 5/1983 | Benedict | 206/443 |
| 4,396,807 | 8/1983 | Brewer | 179/146 R |

Primary Examiner—J. Franklin Foss
Assistant Examiner—Robert A. Olson
Attorney, Agent, or Firm—McGlew and Tuttle

[57] ABSTRACT

A support for a rod-shaped article particularly microphones comprises a fork member, a partial annular fork having an engagement part and a encircling band assembly disengageably connected to the fork member at two axially spaced locations and defining two encircling bands engageable around the article at two axially spaced locations. The bands comprise alternate band link members which have substantially different shapes with one of the link shapes being constructed to engage the engagement part of the fork member. In one embodiment the link members are made of small and large configurations so that small configurations fit into an engagement recess of the fork member and in another embodiment the link members comprise tubular elements of diameters to engage over rod-like portions of the fork member.

4 Claims, 9 Drawing Figures

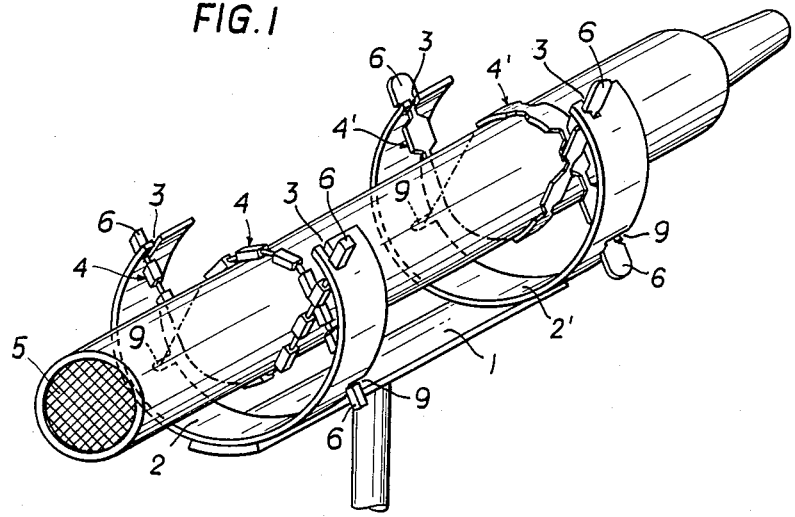
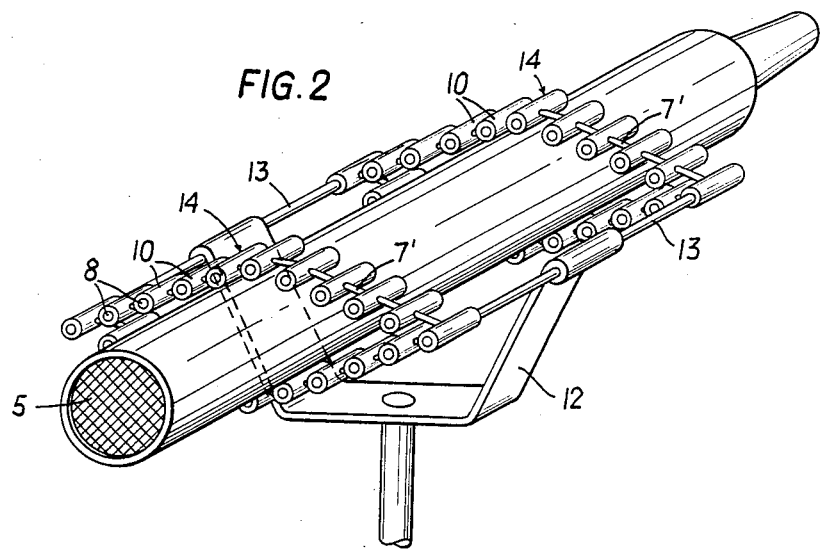

SHOCK ABSORBING SUPPORT FOR MICROPHONES

FIELD AND BACKGROUND OF THE INVENTION

This invention relates in general to microphone supports and in particular to a new and useful shock absorbing microphone support which is simple in design and economical to manfacture.

Various supports resilient in their effect have been known for mounting and shipping objects which are sensitive to shocks, in which the object is supported by springs, rubber cords or rubber bands. Particularly with microphone mounts, it is important to prevent any mechanical shocks or vibrations from passing through the support to the microphone since this would cause interfering noise. Therefore, a prior art design provides to suspend a microphone holding clamping device from springs which are unilaterally secured to a support of any shape. The clamping device for such a support represents some manufacturing expenses and has the additional disadvantage that the diameter of the tubular object to be supported may vary only within narrow limits.

Other prior art supports provide resilient mounting of tubular objects by means of rubber bands or cords suspended from forks. Bands have the disadvantage that they are substantially stiffer in the axial direction of the object to be supported than in the direction perpendicular thereto, so that shocks having a component in the longitudinal axis of the object are damped only insufficiently. With bands having a smaller cross section, better damping properties in the longitudinal axis are obtained. Round rubber cords allow a rolling motion upon an acceleration in the direction of the longitudinal axis of the object to be supported, which, if microphones are concerned, again causes a strong interfering noise and precludes any definite support. Finally, known are supports with unilateral elastic parallelograms which permit optimum adjustment of the damping only if they are suspended. In standing position, the soft parallelogram springs yield under the weight of the supported object and make a mechanically stable anchoring impossible. Supports in which a rod-shaped object is resiliently held in place by means of two diaphragms also belong to the prior art. One of their disadvantages is that the relatively large diaphragms are disturbing, both optically and acoustically.

SUMMARY OF THE INVENTION

The invention is directed to an elastic support for tubular or rod-shaped objects in which the disadvantages of the prior art are eliminated. The invention starts from a design where the object to be resiliently supported is held between elastic bands or the like.

In accordance with the invention a support for a rod-shaped object such as a microphone comprises at least one fork-like or annular part which is equipped with at least two elastic bands whose longitudinal axes extend substantially in a plane parallel to the plane of the fork. The bands at least partly embrace around the microphone and the bands comprise at least two portions which are ultimately and sequentially follow each other and have substantially different shape or cross section from each other. What is obtained is that each band applies against the supported object only by portions, and that, due to a considerable reduction of the cross section of the portions extending between the supporting ones, the elasticity of the entire band is substantially increased also in the transverse direction thereof, so that with the contact areas between the supported object and the respective supporting band portions being relatively large, a satisfactory friction is ensured preventing an axial displacement. It is a substantial feature of the invention that the portions having a smaller cross section are more elastic in bending than the portions having a larger cross section, since otherwise the effect intended by the invention would not be produced.

In accordance with the invention the encircling bands which hold the microphone include portions which have small cross sections and are more or less elastic than portions which have larger cross sections. The portions having smaller cross sections are formed by opposite recesses provided in the band having a flat rectangular cross section corresponding to that of the portion having a large cross section.

As compared to the flat bands mentioned above, such embodiments have the advantage that their portions elastic in bending are provided close to every location where the elastic band tangentially disengages from the object. With stronger oscillations, this prevents the wider, and thus harder, band portions from rubbing on the object and causing noise. All the embodiments of the invention have in common that they provide an equally simple and reliable support for objects of any weight, which may be distributed unsymmetrically or unevenly, and of any diameter, with the mounting requiring no special knowledge or skill. In addition, the inventive elastic bands are less expensive in manufacture and easy to exchange or replace in service.

In accordance with the invention there is provided a support for a rod-shaped article and in particular microphones which comprises a fork member of partial annular form having an engagement part with an encircling band assembly disengagably connected to said fork member peferably at two axially spaced locations and defining preferably two encircling bands engageable around the article at two axially spaced loactions and wherein the bands comprise alternate band link members having substantially different shapes with one of the link shapes being constructed to engage the engagement part of the fork member.

A further object of the invention is to provide a support for microphones and the like which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a front top perspective view of a microphone support constructed in accordance with the invention;

FIG. 2 is a view similar to FIG. 1 of another embodiment of the invention;

DESCRIPTION OF THE PREFERRED EMBODIMENTS

Figure 3:
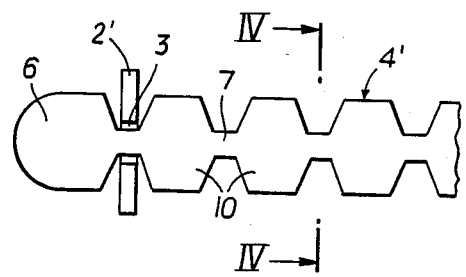
FIG. 3 is a partial plan view showing the construction of one embodiment of link member.

Referring to the drawings in particular the invention embodied therein comprises a band assembly in a support for a rod-shaped article particularly a microphone 5 which includes a fork member 2 which in the embodiment shown is mounted on a concave metal support structure 1 carried on a stand. The arrangement advantageously includes two axially spaced fork members 2 and 2' but of course one could be made sufficient to hold a microphone of relatively short length. The fork members 2 and 2' include engagement parts or recesses 3 which provide means for engaging with an encircling band assembly which in the embodiment shown is made up of two sets of encircling bands 4, 4 and 4', 4'. Each band assembly is disengageably connected to the associated fork member and in the embodiment of FIG. 1 comprises two separate band elements in each axially spaced location which engage with respect to fork members 2 and 2'. The band assemblies 4 comprise individual links 6 and 7 having substantially different shapes or cross sections in a construction such that one of these elements is engageable with the engagement member or recess 3 of the associated fork member 2 or 2'.

In the embodiment of FIG. 1, tubular microphone 5 is resiliently supported. The support comprises strip 1 which may be secured to any stand, for example a tripod. On each of its ends, strip 1 carries open-ended, annular fork member 2,2' having its both ends provided with recess 3 into which elastic band 4,4' is engaged. Second recesses 9 which are provided diametrically opposite to the first ones make it possible to attach to fork member 2, 2' a second elastic band 4,4' in the same way as the first band. Bands 4,4' can be hung into the recesses because each band is made up of portions having cross sections of alternately different size, so that a respective portion having a smaller cross section can be engaged into one of slots 3 in fork member 2, 2'. A rod-shaped microphone 5 will be clamped in the support in the following manner:

First, the two bands 4, and 4' to hang downwardly are engaged into the empty support. Then, microphone 5 is put in place on these bands 4 and 4' and fixed in the desired position by a band placed thereupon and engaged by its ends in the slots or recesses 9. The ends of bands 4 and 4' are designated 6 in FIG. 1 and they both are band portions having large cross section. Should a substantial more slender microphone be clamped in the support, it suffices to engage into one of slots 3 or 9, one of the other small-section band portions which is located further to the midst of the band. For reasons of strength, fork member 2, and 2' may also be designed as a closed ring. Then, prior to engaging the other bands, microphone 5 would be put in correct position by introduction from one side. In the arrangement of FIG. 1 in which the microphone is embraced by the two bands, 4 and 4' almost completely, the portions having a smaller cross section provide an elastic support by which mainly shocks in the axial direction of the microphone are absorbed to a large extent. Upon an axial push or shock, microphone 5 will rock in the support like in a swing. Substantially no return forces act in the rest position of the microphone. Such forces progressively appear only with the increasing amplitude of oscillation so that an excellent and, in paractice, optimum damping is obtained in the axial direction of the microphone, in which the microphone is particularly sensitive. Due to the high elasticity in the longitudinal direction of the inventive bands, a satisfactory damping of shocks or vibrations which have penetrated to the support is obtained in all other directions too.

Figure 4:
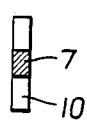
FIG. 4 is a section taken along the line IV—IV of FIG. 3.

In FIG. 1 showing the support with two fork members 2 and 2', different designs of bands 4 and 4' are shown at each fork. In practice, of course, four identical bands will be employed in a single support. Band 4' shown at fork member 2' is also shown in FIG. 3, in a top plan view, and in FIG. 4 in section. This most simple design of a band suitable for the inventive support comprises flat, broad portions 10 connected through portions 7 which have strongly reduced cross section. At the end of the band, a grip portion 6 is provided to facilitate the manipulation during the operation of fixing the rod-like or tubular body, in the support. As shown in FIG. 3, the manufacture of such a band is simple, since only cutting or punching out of recesses on both longitudinal sides of a standard flat strip is to be provided. The design of the other band shown in fork member 2 of FIG. 1 is somewhat less simple, however, such a band may easily be manufactured in a suitable forming or vulcanizing machine.

Figure 5:
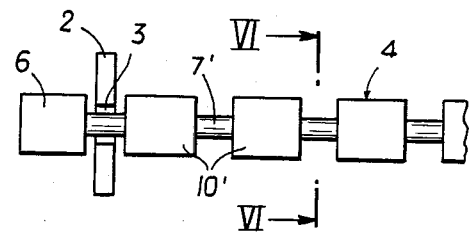
FIG. 5 is a view similar to FIG. 3 of another embodiment of the invention.
Figure 6A:
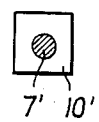
FIGS. 6a and 6b are sections taken along the line VI—VI of FIG. 5 showing two different embodiments of the construction of FIG. 5.
Figure 6B:
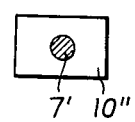

Such a band is shown in a top plan view and in cross section in FIGS. 5 and 6. Portions 10' and 10" having a larger cross section alternate with portions 7' of substantially smaller cross section. The small-section portions may be cord-or band-shaped, or of any desired cross section. What is important is to provide a substantially smaller cross section area as compared to that of the larger portions, so as to obtain a sufficient elasticity satisfying the purpose. The portions with the large cross section may have the shape of tubes or prisms, as shown in the cross sections of FIGS. 6a and 6b. The small-section portions will advantageously be cylindrical, but they might have any other cross sectional shape. In FIGS. 3 and 5, adjacent the grip portions 6, also the end of fork member 2' with slot 3 is shown.

Figure 7:
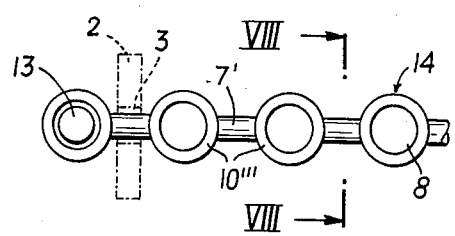
FIG. 7 is a view similar to FIG. 3 of another embodiment of the invention.
Figure 8:
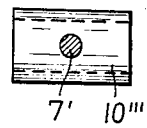
FIG. 8 is a sectional view taken along the lines VIII—VIII of FIG. 7.

FIG. 2 shows another embodiment of the inentive support. In this embodiment, a single fork member or fork 12 is provided carrying a rod-shaped structural element 13 which extends parallel to the longitudinal direction of the object to be supported between elastic bands, again a microphone 5 for example. Advantageously, in this instance, a band will be employed such as shown in FIG. 2, which can be engaged on the rod-shaped elements without requiring any previous machining thereof. A band of this kind comprises hollow cylindrical bodies 10 which are connected to each other centrally, in their mid zones and perpendicularly to their longitudinal axes, through cord-or band-shaped portions 7'. A side view and a cross sectional view of such a band is shown in FIGS. 7 and 8. It is evident that with the band 14 in place, it suffices to simply slip portions 10''' having the larger cross section onto the respective rod-shaped element 13 which thus will engage cavity 8 of body 10'''. FIG. 2 shows this engagement and also the fact that the provided manner of clamping is different from that of FIG. 1. That is, microphone 5 is clamped between two sides or halves of an endless band 14. The elasticity of band portions 7' having a smaller cross section and the resilient fork 12 make it possible to receive in the support rod-shaped or tubular objects of substantially different diameters without the necessity of exchanging band 14 for another having a larger or smaller parimetric extent. Like the bands discussed above, band 14 can be manufactured simply in a mold. If not made as an endless loop, it may be made as a band with two ends, in which case it may also be employed in a support according to FIG. 1. For such a use, portions 10''' need not be hollow cylinders. However, a design with hollow cylindrical bodies is preferable since such band portions deform easier, which is advantageous for damping the oscillations.

Fork members 2 and 2' or resilient fork 12 may be employed as additional damping elements by approximately matching the spring modulus of the forks or fork members to the spring modulus of the bands. Resilient fork members or forks also reduce the risk of bending or breaking the support.

While specific embodiments of the invention have been shown and described in detail to illustrate the application of the principles of the invention, it will be understood that the invention may be embodied otherwise without departing from such principles.

What is claimed is:

1. A band assembly adapted to embrace a microphone, comprising:
   a support structure;
   a U-shaped open ended fork member mounted on each end of said support structure, each fork member having a pair of ends spaced apart from each other and remote from said support structure with a first slot in each end of each fork member and a second slot spaced away from each end of each fork member and between said first slot and said support structure on each side of each fork member;
   a first elastic band connected between the first slots of each fork member;
   a second elastic band connected between said second slots of each fork member; and
   each elastic band comprising a multiplicity of alternating large and small cross-sectioned portions, one small cross-sectioned portion adjacent each end of each band being engaged into one of said first and second slots, said first and second band adapted to embrace a microphone for elastically supporting a microphone on said fork members, each small cross-section portion being more elastic than each large cross-section of each band.

2. A band assembly according to claim 1, wherein said small cross-sectioned portions are formed by recesses on opposite sides of each elastic band.

3. A band assembly according to claim 1, wherein each of said large cross-sectioned portions is prism-shaped, each of said small cross-sectioned portions being rod-shaped and connected between adjacent ones of said prism-shaped portions along each band.

4. A band assembly according to claim 1, wherein each of said large cross-sectioned portions comprise a cylindrical hollow body with each hollow body being connected to another centrally perpendicularly to their longitudinal axis by a small cross-sectioned portion.

* * * * *

UNITED STATES PATENT OFFICE
CERTIFICATE OF CORRECTION

Patent No. 4,546,950             Dated Oct. 15, 1985

Inventor(s) Karl Cech

It is certified that error appears in the above-identified patent and that said Letters Patent are hereby corrected as shown below:

Correct name of Assignee is as follows:

AKG Akustische u, Kino-Geräte Gesellschaft m.b.H.,

*Signed and Sealed this*

*Seventeenth* Day of *June 1986*

[SEAL]

*Attest:*

DONALD J. QUIGG

*Attesting Officer*          *Commissioner of Patents and Trademarks*